United States Patent [19]

Custer, Jr. et al.

[11] Patent Number: 5,275,539
[45] Date of Patent: Jan. 4, 1994

[54] INTERNAL COMBUSTION ENGINE OIL PUMP

[75] Inventors: Donald E. Custer, Jr.; James E. Macier, Beach Park, both of Ill.; John M. Mahoney, II, Bristol, Wis.; Geno C. Mangubat, Zion, Ill.

[73] Assignee: Outboard Marine Corporation, Waukegan, Ill.

[21] Appl. No.: 896,143

[22] Filed: Jun. 9, 1992

[51] Int. Cl.$^5$ .............................................. F04B 17/00
[52] U.S. Cl. ..................... 417/401; 417/398; 417/46; 123/452
[58] Field of Search ............... 417/392, 399, 397, 401, 417/46, 26; 137/554; 251/129.04; 123/297, 452, 501

[56] References Cited

U.S. PATENT DOCUMENTS

| | | | |
|---|---|---|---|
| 921,760 | 5/1909 | Waterman | 137/554 |
| 2,510,649 | 6/1950 | Neff | 417/401 |
| 2,620,628 | 12/1952 | Ray | 417/401 |
| 2,731,906 | 1/1956 | King | 417/392 |
| 3,496,879 | 2/1970 | Brandes | 417/46 |
| 4,195,662 | 4/1980 | Gottel | 137/554 |
| 4,413,647 | 11/1983 | DeLorenzo | 417/392 |
| 4,475,407 | 10/1984 | Kruncos | 73/861.53 |
| 4,518,326 | 5/1985 | Peruzzi | 417/902 |
| 4,539,949 | 9/1985 | Walsworth | 123/73 |
| 4,552,101 | 11/1985 | Borst et al. | 123/73 |
| 4,601,211 | 7/1986 | Whistler | 137/554 |
| 4,678,160 | 7/1987 | Yamada | 137/554 |
| 4,699,109 | 10/1987 | Hensel | 123/458 |
| 4,700,671 | 10/1987 | Matsushita | 123/198 |
| 4,730,580 | 3/1988 | Matsushita | 123/73 |
| 4,757,795 | 7/1988 | Kelly | 123/501 |
| 4,811,717 | 3/1989 | Nakahama | 123/509 |
| 4,846,307 | 7/1989 | Kinouchi et al. | 184/6.5 |
| 4,887,559 | 12/1989 | Hensel et al. | 123/73 |
| 4,909,222 | 3/1990 | Takamo et al. | 123/470 |
| 4,913,108 | 4/1990 | Sougawa et al. | 123/196 |

Primary Examiner—Richard A. Bertsch
Assistant Examiner—Peter Korytnyk
Attorney, Agent, or Firm—Michael, Best & Friedrich

[57] ABSTRACT

A lubricant pump for supplying lubricant to an internal combustion engine, the pump comprising a housing defining a pump chamber, an inlet which is adapted to communicate with a source of lubricant and which communicates with the pump chamber, and an outlet which is adapted to communicate with the internal combustion engine and which communicates with the pump chamber, the housing also at least partially defining a fluid chamber, a source of fluid under pressure, a solenoid for selectively and alternatively affording and preventing communication of the fluid chamber with the fluid source, and a pumping member for drawing lubricant into the pump chamber in response to communication of the fluid chamber with the fluid source and for forcing lubricant out of the pump chamber in the absence of communication between the fluid chamber and the fluid source.

20 Claims, 2 Drawing Sheets

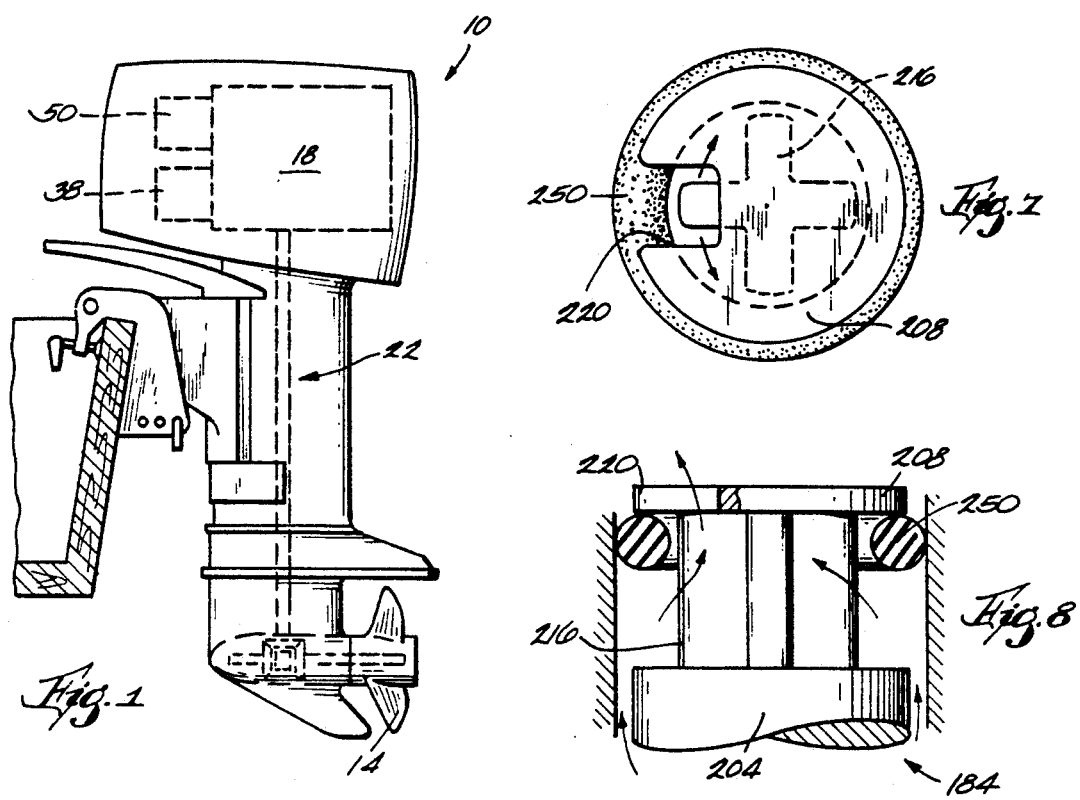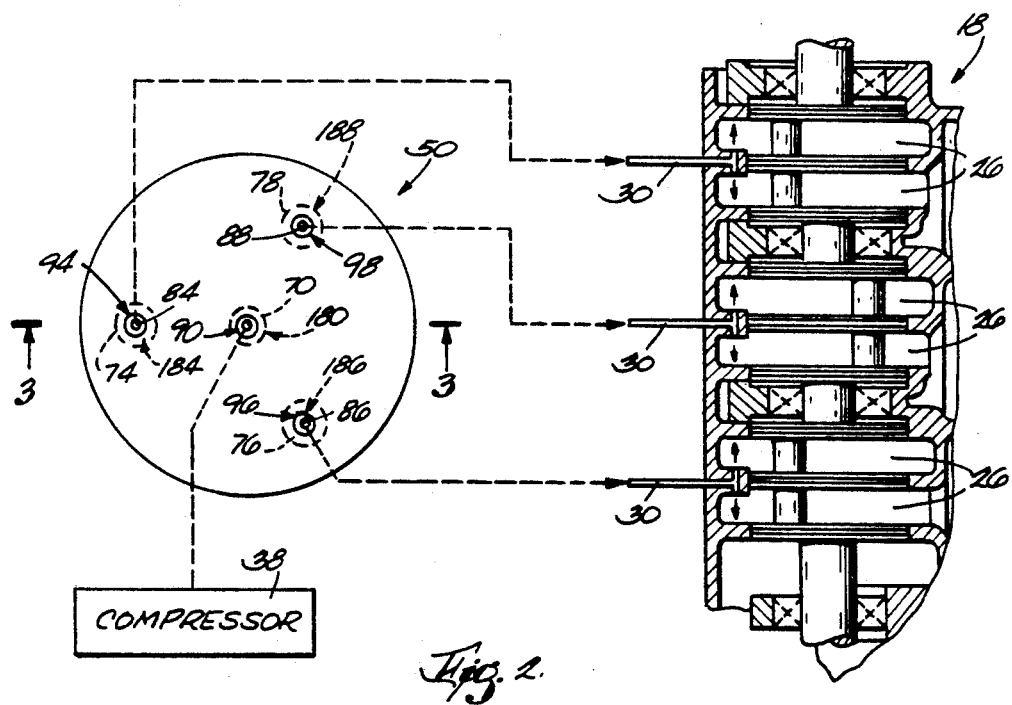

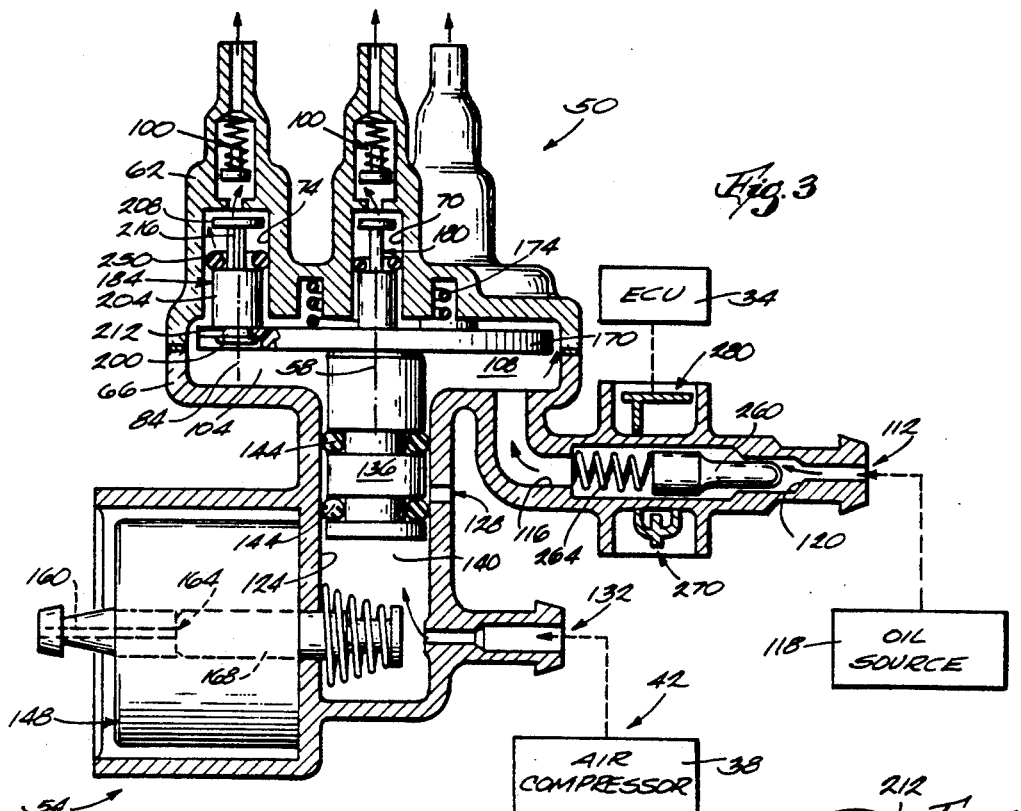
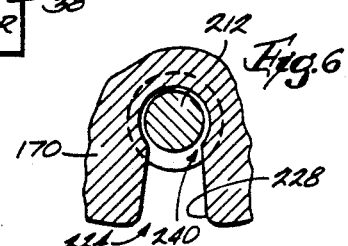
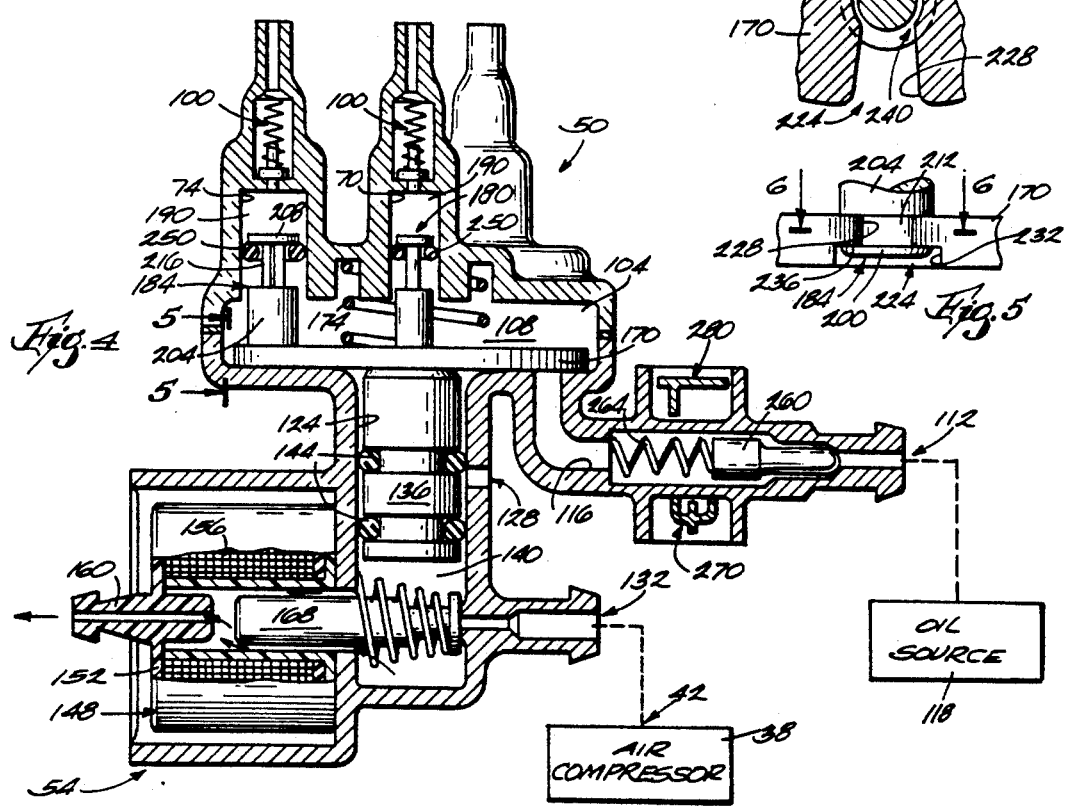
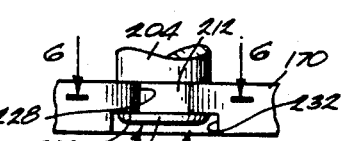

5,275,539

INTERNAL COMBUSTION ENGINE OIL PUMP

BACKGROUND OF THE INVENTION

The invention relates to oil pumps for internal combustion engines.

A known oil pump includes a plurality of pumping pistons, each of which pumps oil to a different engine location. The pistons are all fixed to a common plate or member for movement therewith. A solenoid plunger is connected to the plate and causes movement of the plate.

SUMMARY OF THE INVENTION

The invention provides a lubricant pump for supplying lubricant to an internal combustion engine, the pump comprising a housing defining a pump chamber, an outlet which is adapted to communicate with a source of lubricant and which communicates with the pump chamber, and an outlet which is adapted to communicate with the internal combustion engine and which communicates with the pump chamber, the housing also at least partially defining a fluid chamber, a source of fluid under pressure, means for selectively and alternatively affording and preventing communication of the fluid chamber with the fluid source, and pumping means for drawing lubricant into the pump chamber in response to communication of the fluid chamber with the fluid source and for forcing lubricant out of the pump chamber in the absence of communication between the fluid chamber and the fluid source.

One embodiment of the invention provides a lubricant pump comprising a housing defining a first bore having a first axis and defining a second bore having a second axis spaced from and parallel to the first axis, a pumping member supported by the housing for reciprocal movement relative thereto in the direction of the axes, a first piston which is slidably housed in the first bore, which cooperates with the housing to define a first variable-volume pumping cavity, and which is connected to the member for common movement therewith, and a second piston which is slidably housed in the second bore, which cooperates with the housing to define a second variable-volume pumping cavity, and which is connected to the member for common reciprocal movement therewith and for limited movement relative to the member and transversely to the second axis.

One embodiment of the invention provides a lubricant pump assembly comprising a housing defining a pump chamber having an inlet and an outlet, a ferrous member supported by the housing for movement relative thereto between first and second positions and such that the member moves to the first position in response to lubricant flow into the pump chamber and moves to the second position in the absence of lubricant flow into the pump chamber, a magnet supported by the housing, a Hall effect switch supported by the housing such that, when the member is in the second position, flux from the magnet extends to the Hall effect switch so that the Hall effect switch is in a first condition, and such that, when the member is in the first position, the member short circuits the flux from the magnet so that the flux does not extend to the Hall effect switch and so that the Hall effect switch is in a second condition, pumping means for drawing fluid into the pump chamber and for forcing fluid out of the pump chamber, and priming means for causing operation of the pumping means when the Hall effect switch is in the first condition for more than a predetermined period of time.

A principal feature of the invention is the provision of an oil pump in which movement of the pumping pistons is caused by compressed air. A solenoid is used only to open the compressed air inlet. This requires substantially less electrical power than prior art constructions.

Another principal feature of the invention is the "floating" connection of the pistons to the pumping member or plate. This allows for variation in the distances between the piston bores. Also, the fluid piston is separate from the pumping member. This allows for misalignment of the housing portions.

Another principal feature of the invention is the above-described arrangement wherein the pump is primed when the Hall effect switch is on, i.e. when flux from the magnet extends to the Hall effect switch. This arrangement is more accurate than prior art arrangements.

Other features and advantages of the invention will become apparent to those skilled in the art upon review of the following detailed description, claims and drawings.

DESCRIPTION OF THE DRAWINGS

FIG. 1 is a side elevational view of an outboard motor embodying the invention.

FIG. 2 is a schematic view of the internal combustion engine, air compressor and oil pump of the outboard motor.

FIG. 3 is a view taken along line 3—3 in FIG. 2, showing the oil pump at the end of a pumping stroke.

FIG. 4 is a view similar to FIG. 3 showing the oil pump at the end of a return stroke.

FIG. 5 is a view taken along line 5—5 in FIG. 4.

FIG. 6 is a view taken along line 6—6 in FIG. 5.

FIG. 7 is a top plan view of one of the pistons.

FIG. 8 is a partial, side elevational view of the piston shown in FIG. 7.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An outboard motor 10 embodying the invention is illustrated in FIG. 1. The outboard motor 10 includes a propeller 14, and an internal combustion engine 18 drivingly connected to the propeller 14 by a conventional drive train 22. The illustrated engine 18 is a six-cylinder, two-cycle engine including, as shown in FIG. 2, six crankcase chambers 26. The engine 18 also includes three oil passageways 30, with each passageway 30 communicating with a respective pair of crankcase chambers 26. Such an arrangement is disclosed in U.S. Ser. No. 654,088, which was filed February 11, 1991 and which is incorporated herein by reference. The engine 18 also includes (see FIG. 3) an electronic control unit 34 which, except as described below, is conventional.

The outboard motor 10 also comprises a air compressor 38 driven by the engine 18. The air compressor 38 has (see FIG. 3) an outlet 42 providing compressed air at a substantially constant pressure of 80 psi.

The outboard motor 10 also comprises a lubricant or oil pump 50 for supplying oil to the engine 18. The pump 50 comprises (see FIG. 3) a housing 54 which, in the illustrated construction, has a first or central axis 58 and includes upper and lower portions 62 and 66. The upper housing portion 62 defines a first or central bore 70 centered on the central axis 58. The upper housing portion 62 also defines (see FIG. 2) second, third and fourth bores 74, 76 and 78 having respective second, third and fourth axes 84, 86 and 88. The bores 74, 76 and 78 are slightly larger in diameter than the bore 70. Each of the axes 84, 86 and 88 is spaced from and parallel to the axis 58. In the illustrated construction, the axes 84, 86 and 88 are equally spaced around a circle centered on the axis 58. The upper housing portion 62 also defines outlets 90, 94, 96 and 98 communicating with the bores 70, 74, 76 and 78, respectively. Each of the outlets 90, 94, 96 and 98 has therein (see FIG. 3) a check valve 100 permitting oil flow out of the bore and preventing oil flow into the bore. As shown in FIG. 2, the outlet 90 communicates with the air compressor 38 for supplying oil thereto, and each of the outlets 94, 96 and 98 communicates with a respective one of the passageways 30 for supplying oil thereto.

The lower housing portion 66 cooperates with the upper housing portion 62 to define a pump chamber 104 including the bores 70, 74, 76 and 78 and a common oil reservoir 108. The lower housing portion 66 also defines an oil inlet 112, and an inlet passageway 116 communicating between the inlet 112 and the pump chamber 104. The inlet 112 communicates with a suitable source 118 (see FIG. 3) of oil or lubricant. The passageway 116 has therein a valve seat 120 adjacent the inlet 112. The lower housing portion 66 further defines a bore 124 which extends downwardly from the pump chamber 104 and which is generally centered on the axis 58. Although the bore 70 in the upper housing portion and the bore 124 in the lower housing portion are generally coaxial, the construction of the pump 50 allows for some misalignment of their axes. This is explained below. A vent opening 128 and an air inlet 132 communicate with the bore 124. The inlet 132 communicates with the air compressor outlet 42.

The pump 50 also comprises (see FIG. 3) a fluid piston 136 slidably supported by the lower housing portion 66 within the bore 124. The fluid piston 136 cooperates with the lower housing portion 66 to define a fluid chamber 140 communicating with the inlet 132. The fluid chamber 140 has a variable volume which increases in response to upward movement of the fluid piston 136 and decreases in response to downward movement of the fluid piston 136. Spaced O-rings 144 on the fluid piston 136 sealingly engage the lower housing portion 66. The upper O-ring 144 is located above the vent opening 128 throughout the range of movement of the fluid piston 136, and the lower O-ring 144 is located below the vent opening 128 throughout the range of movement of the fluid piston 136. The reason for this is explained below.

The pump 50 further comprises means for selectively and alternatively opening and closing the inlet 132 and thereby selectively and alternatively affording and preventing communication of the fluid chamber 140 with the air compressor outlet 42. Such means includes a solenoid 148 supported by the housing. The solenoid 148 includes (see FIG. 4) a housing 152 supporting a coil 156. The housing 152 defines an air vent passageway 160 having an inner end 164 (see FIG. 3). The solenoid 148 also includes a plunger 168 movable between a right or closing position and a left or open position. In the closing position, the plunger 168 closes the inlet 132 and is spaced from the inner end 164 of the air vent passageway 160, so that air can escape from the fluid chamber 140 through the annular space between the plunger 168 and the coil 156 and through the passageway 160. In the open position, the plunger 168 is spaced from the inlet 132 and closes the passageway 160, so that air can enter the fluid chamber 140 through the inlet 132 and cannot escape through the passageway 160. The plunger 168 is biased toward the closing position, and actuation of the solenoid 148 moves the plunger 168 to the open position.

The pump 50 also comprises pumping means for drawing oil into the pump chamber 104 in response to communication of the fluid chamber 140 with the air compressor 38 and for forcing oil out of the pump chamber 104 in the absence of communication between the fluid chamber 140 and the air compressor 38. This pumping means preferably includes means for drawing oil into the pump chamber 104 in response to upward movement of the fluid piston 136 and for forcing oil out of the pump chamber 104 in response to downward movement of the fluid piston 136. More particularly, the pumping means includes (see FIG. 3) a pumping member or plate 170 movably housed within the pump chamber 104, and specifically within the oil reservoir 108. The pumping member 170 is separate from the fluid piston 136, and the underside of the pumping member 170 engages the upper end of the fluid piston 136. A spring 174 extends between the upper housing portion 162 and the pumping member 170 and biases the pumping member 170 downwardly and into engagement with the fluid piston 136. The spring 174 thus biases the fluid piston 136 downwardly. Because the pumping member 170 is separate from the fluid piston 136, exact alignment of the upper and lower housing portions is not necessary.

The pumping means also includes (see FIGS. 2 and 3) first, second, third and fourth pistons 180, 184, 186 and 188 slidably housed in the bores 70, 74, 76 and 78, respectively. Each piston 180, 184, 186 or 188 cooperates with the upper housing portion 62 to define a respective variable-volume pumping cavity 190 (see FIG. 4) that is located above the piston and that communicates with the associated outlet 80, 84, 86 or 88. The piston 180 is fixedly connected to the pumping member 170 for common movement therewith. Each of the other pistons 184, 186 and 188 is connected to the pumping member 170 for common reciprocal movement therewith and for limited movement relative to the pumping member 170 and transversely to the piston axis. More particularly, each of the pistons 184, 186 and 188 is connected to the pumping member 170 for limited movement relative thereto both radially and angularly relative to the axis 58. The pistons 184, 186 and 188 are substantially identical (except that the piston 180 is slightly smaller in diameter than the other pistons), and only the piston 184 will be described in detail.

The piston 184 includes (see FIGS. 3, 4, 5, 7 and 8) a lower increased-diameter portion 200, an intermediate increased-diameter portion 204, and an upper increased-diameter portion 208. The piston 184 also includes a lower reduced-diameter portion 212 connecting the lower increased-diameter portion 200 and the intermediate increased-diameter portion 204, and an upper reduced-diameter portion 216 connecting the intermediate increased-diameter portion 204 and the upper increased-diameter portion 208. Each of the portions 200, 204, 208 and 212 is generally cylindrical. The upper reduced-diameter portion 216, on the other hand, has a cross-shaped cross section. The intermediate increased-diameter portion 204 has a diameter slightly less than the diameter of the associated bore, so that oil can flow between the intermediate increased-diameter portion 204 and the upper housing portion 62. The upper increased-diameter portion 208 has therein (see FIGS. 7 and 8) a radially inwardly extending notch or recess 220. The reason for the notch 220 is explained below.

The pumping member 170 has therein (see FIGS. 5 and 6), for each of the outer pistons 184, 186 and 188, a radially inwardly extending notch or recess 224. The recesses 224 are substantially identical, and only the recess 224 associated with the piston 184 will be described in detail.

The recess 224 includes upper and lower portions 228 and 232. The upper portion 228 is narrower than the lower portion 232. This forms a step or shoulder 236 (see FIG. 5) between the upper and lower portions of the recess 224. The upper portion 228 of the recess 224 converges radially inwardly to a neck 240 (see FIG. 6), beyond which the upper portion of the recess 224 becomes generally circular and has a width slightly greater than the width at the neck.

The lower reduced-diameter portion 212 of the piston 184 is housed in the upper portion 228 of the recess 224, and the lower increased-diameter portion 200 of the piston 184 is housed in the lower portion 232 of the recess 224. The lower increased-diameter portion 200 of the piston 184 engages the shoulder 236 to prevent upward movement of the piston 184 relative to the pumping member 170, and the intermediate increased-diameter portion 204 of the piston 184 engages the upper surface of the pumping member 170 to prevent downward movement of the piston 184 relative to the pumping member 170. The diameter of the lower reduced-diameter portion 212 of the piston 184 is slightly greater than the width of the upper recess portion 228 at its neck, and one or both of the piston 184 and the pumping member 170 are resilient so that the piston 184 snaps into the recess 224. The diameter of the lower reduced-diameter of the piston 184 is slightly less than the diameter of the circular part of the upper recess portion 228, and the diameter of the lower increased-diameter portion 200 of the piston 184 is slightly less than the width of the lower recess portion, so as to allow relative movement between the piston 184 and the pumping member 170.

An O-ring 250 (see FIGS. 7 and 8) is mounted on each of the pistons 180, 184, 186 and 188 in surrounding relation to the upper reduced-diameter portion 216 and between the intermediate and upper increased-diameter portions. The O-rings 250 are substantially identical, and only the O-ring 250 associated with the piston 180 will be described in detail.

The thickness of the O-ring 250 is substantially less than the height of the upper reduced-diameter portion 216 so that the O-ring 250 is movable relative to the piston 180 between an upper position (shown in FIGS. 4 and 8) in which the O-ring 250 engages the upper increased-diameter portion 208 and a lower position (shown in FIG. 3) in which the O-ring 250 engages the intermediate increased-diameter portion 204. The combination of the annular O-ring 250 and the cross-shaped upper reduced-diameter portion 216 creates spaces between the inside of the O-ring 250 and the upper reduced-diameter portion 216.

During upward movement of the piston 180, the O-ring 250 seats against the intermediate increased-diameter portion 204 (as shown in FIG. 3) and creates a seal between the intermediate increased-diameter portion 204 and the upper housing portion 62. As a result, oil cannot flow past the O-ring 250 during upward movement of the piston 180. Oil in the pumping cavity 190 above the piston 180 must therefore flow out the outlet 90 during upward movement of the piston 180. Such oil flow is indicated by arrows in FIG. 3.

During downward movement of the piston 180, as shown in FIG. 8, the O-ring 250 seats against the upper increased-diameter portion 208, and oil can flow inside the O-ring 250 and through the notch 220 in the upper increased-diameter portion 208. Such oil flow is indicated by arrows in FIGS. 7 and 8. Thus, during downward movement of the piston 180, oil can flow upwardly around the intermediate increased-diameter portion 204, inside the O-ring 250, and out through the notch 220 to the pumping cavity 190 above the piston 180. The foregoing also applies to the pistons 184, 186 and 188.

The pump 50 also comprises (see FIG. 3) a ferrous valve member 260 slidably housed within the inlet passageway 116 for movement between a first or left position (see FIG. 3) wherein the member 260 is out of engagement with the valve seat 120 and a second or right position (see FIG. 4) wherein the member 260 engages the valve seat 120. Thus, the inlet 112 is open when the member 260 is in its left position and is closed when the member 260 is in its right position. A spring 264 biases the member 260 toward the valve seat 120. The member 260 moves away from the valve seat 120 (to its left position) in response to oil flow into the pump chamber 104 and moves into engagement with the valve seat 120 (to its right position) in the absence of oil flow into the pump chamber 104.

The pump 50 also comprises (see FIG. 3) a magnet 270 supported by the lower housing portion 66 on one side of the inlet passageway 116, and a Hall effect switch 280 supported by the lower housing portion 66 on the opposite side of the inlet passageway 116. When the valve member 260 is in its right position, i.e., when oil is not flowing into the pump chamber 104, flux from the magnet 270 extends to the Hall effect switch 280 so that the switch 280 is on or in a first condition. When the valve member 260 is in its left position, i.e., when oil is flowing through the passageway 116, the member 260 short circuits the flux from the magnet 270 so that the flux does not extend to the switch 280 and so that the switch 280 is off or in a second condition. It should be noted that air flow through the passageway 116 will not move the member 260 away from the valve seat 120 far enough to turn the switch 280 off. In other words, the member 260 will not move to its first or left position in response to air flow through the passageway 116.

During normal operation of the engine 18, the electronic control unit 34 periodically activates the solenoid 148 to open the air inlet 132. Increased pressure in the fluid chamber 140 causes upward movement of the fluid piston 136, the pumping member 170 and the pistons 180, 184, 186 and 188. Upward movement of the pistons 180, 184, 186 and 188 forces oil out through the outlets 90, 94, 96 and 98. Upward movement of the pumping member 170 sucks oil into the pump chamber 104 through the inlet passageway 116. Such oil flow through the passageway 116 moves the member 260 to its left position. This turns the switch 280 off, and the electronic control unit 34 is thereby informed that oil is flowing into the pump chamber 104. When the electronic control unit 34 deactivates the solenoid 148, the plunger 168 closes the air inlet 132, and air in the fluid chamber 140 escapes through the solenoid 148 as described above. Reduced pressure in the fluid chamber 140 allows the spring 174 to move the pistons 180, 184, 186 and 188, the pumping member 170 and the fluid piston 136 downwardly to their lowermost positions. Downward movement of the pumping member 170 forces oil around the pumping member 170 (from below the pumping member 170 to above the pumping member 170) and then upwardly inside the O-rings 250 to the pumping cavities 190 above the pistons 180, 184, 186 and 188. This fills the pumping cavities 190 with oil. The pump 50 is then ready for another pumping stroke.

In the event oil should leak past the upper O-ring 144 or air should leak past the lower O-ring 144, the leaking fluid (oil or air) will flow out the vent opening 128 rather than flowing past the other O-ring 144 and mixing with the other fluid.

During starting of the engine 18, the pump 50 may initially suck air through the inlet 112. This could cause inadequate engine lubrication. In order to substantially prevent such inadequate lubrication, means are provided for priming the pump 50. If the electronic control unit 34 determines that the switch 280 has been on (i.e., that the member 260 has been in its right position, indicating no oil flow through the passageway 116) for more than a predetermined period of time, the electronic control unit 34 rapidly activates and deactivates the solenoid 148 until the switch 280 turns off (i.e., until the member 260 moves to its left position, indicating oil flow through the passageway 116). The electronic control unit 34 then returns to normal operation of the pump 50.

Various features of the invention are set forth in the following claims.

We claim:

1. A lubricant pump for supplying lubricant to an internal combustion engine, said pump comprising
   a housing defining a pump chamber, an inlet which is adapted to communicate with a source of lubricant and which communicates with said pump chamber, and an outlet which is adapted to communicate with the internal combustion engine and which communicates with said pump chamber, said housing also at least partially defining a fluid chamber,
   a source of fluid under pressure,
   means for selectively and alternatively affording and preventing communication of said fluid chamber with said fluid source, and
   pumping means for drawing lubricant into said pump chamber in response to communication of said fluid chamber with said fluid source and for forcing lubricant out of said pump chamber in the absence of communication between said fluid chamber and said fluid source.

2. A pump as set forth in claim 1 wherein said fluid source is a source of compressed air.

3. A pump as set forth in claim 1 wherein said fluid chamber has an inlet communicating with said fluid source, and wherein said means for selectively and alternatively affording and preventing communication between said fluid chamber and said fluid source includes means for selectively and alternatively opening and closing said inlet.

4. A pump as set forth in claim 3 wherein said means for selectively and alternatively opening and closing said inlet includes a solenoid which is supported by said housing and which has a plunger movable relative to a position in which said plunger closes said inlet.

5. A pump as set forth in claim 4 wherein said plunger is biased toward said closing position, and wherein actuation of said solenoid causes movement of said plunger away from said closing position.

6. A pump as set forth in claim 1 and further comprising a fluid piston which is slidably supported by said housing and which cooperates with said housing to define said fluid chamber, wherein said fluid chamber has a variable volume which increases in response to movement of said fluid piston in one direction and decreases in response to movement of said fluid piston in the opposite direction, and wherein said pumping means includes means for drawing lubricant into said pump chamber in response to movement of said fluid piston in said one direction and for forcing lubricant out of said pump chamber in response to movement of said fluid piston in said opposite direction.

7. A pump as set forth in claim 6 wherein said pumping means includes a pumping member which is movably housed within said pump chamber, and means for moving said pumping member in said one direction in response to movement of said fluid piston in said one direction.

8. A pump as set forth in claim 7 wherein said fluid piston is separate from said pumping member.

9. A pump as set forth in claim 6 and further comprising means for biasing said fluid piston in said opposite direction.

10. A lubricant pump as set forth in claim 1 wherein said housing also defines a first bore having a first axis and defines a second bore having a second axis spaced from and parallel to said first axis, said bores partially defining said pump chamber, and wherein said pumping means includes a pumping member supported by said housing for reciprocal movement relative thereto in the direction of said axes, a first piston which is slidably housed in said first bore, which cooperates with said housing to define a first variable-volume pumping cavity, and which is connected to said member for common movement therewith, and a second piston which is slidably housed in said second bore, which cooperates with said housing to define a second variable-volume pumping cavity, and which is connected to said member for common reciprocal movement therewith and for limited movement relative to said member and transversely to said second axis.

11. A lubricant pump as set forth in claim 1 and further comprising a ferrous member supported by said housing for movement relative thereto between first and second positions and such that said member moves to said first position in response to lubricant flow into said pump chamber and moves to said second position in the absence of lubricant flow into said pump chamber, a magnet supported by said housing, a Hall effect switch supported by said housing such that, when said member is in said second position, flux from said magnet extends to said Hall effect switch so that said Hall effect switch is in a first condition, and such that, when said member is in said first position, said member short circuits the flux from said magnet so that the flux does not extend to said Hall effect switch and so that said Hall effect switch is in a second condition, and priming means for causing operation of said pumping means when said Hall effect switch is in said first condition for more than a predetermined period of time.

12. A lubricant pump comprising a housing defining a first bore having a first axis and defining a second bore having a second axis spaced from and parallel to said first axis, a pumping member supported by said housing for reciprocal movement relative thereto in the direction of said axes, a first piston which is slidably housed in said first bore, which cooperates with said housing to define a first variable-volume pumping cavity, and which is connected to said member for common movement therewith, and a second piston which is slidably housed in said second bore, which cooperates with said housing to define a second variable-volume pumping cavity, and which is connected to said member for common reciprocal movement therewith in the direction of said axes and for limited movement relative to said member in a direction transverse to said second axis.

13. A lubricant pump as set forth in claim 12 wherein said pumping member is centered on said first axis, and wherein said second piston is connected to said pumping member for limited movement relative thereto in a direction extending radially with respect to said first axis and in an arcuate direction about said first axis.

14. A lubricant pump as set forth in claim 13 wherein said housing also defines a third bore having a third axis spaced from and parallel to said first and second axes, and wherein said pump further comprises a third piston which is slidably housed in said third bore, which cooperates with said housing to define a third variable-volume pumping cavity, and which is connected to said member for common reciprocal movement therewith in the direction of said axes and for limited movement relative to said member and in a direction transverse to said third axis.

15. A lubricant pump as set forth in claim 12 wherein said housing also defines a pump chamber including said pumping cavities, and wherein said pump further comprises a ferrous member supported by said housing for movement relative thereto between first and second positions and such that said member moves to said first position in response to lubricant flow into said pump chamber and moves to said second position in the absence of lubricant flow into said pump chamber, a magnet supported by said housing, a Hall effect switch supported by said housing such that, when said member is in said second position, flux from said magnet extends to said Hall effect switch so that said Hall effect switch is in a first condition, and such that, when said member is in said first position, said member short circuits the flux from said magnet so that the flux does not extend to said Hall effect switch and so that said Hall effect switch is in a second condition, and priming means for causing operation of said pumping means when said Hall effect switch is in said first condition for more than a predetermined period of time.

16. A lubricant pump assembly comprising
a housing defining a pump chamber having an inlet and an outlet,
a ferrous member supported by said housing for movement relative thereto between first and second positions and such that said member moves to said first position in response to lubricant flow into said pump chamber and moves to said second position in the absence of lubricant flow into said pump chamber,
a magnet supported by said housing,
a Hall effect switch supported by said housing such that, when said member is in said second position, flux from said magnet extends to said Hall effect switch so that said Hall effect switch is in a first condition, and such that, when said member is in said first position, said member short circuits the flux from said magnet so that the flux does not extend to said Hall effect switch and so that said Hall effect switch is in a second condition,
pumping means for drawing fluid into said pump chamber and for forcing fluid out of said pump chamber, and
priming means for causing operation of said pumping means when said Hall effect switch is in said first condition for more than a predetermined period of time.

17. A pump assembly as set forth in claim 16 wherein said housing also defines an inlet passageway communicating between said inlet and said pump chamber, and wherein said member is located in said inlet passageway.

18. A pump assembly as set forth in claim 17 wherein said passageway has therein a valve seat adjacent said inlet, wherein said member is movable into and out of engagement with said valve seat so as to close and open said inlet, and wherein said member moves out of engagement with said valve seat in response to lubricant flow into said inlet.

19. A pump assembly as set forth in claim 18 and further comprising means for biasing said member into engagement with said valve seat.

20. A pump assembly as set forth in claim 17 wherein said Hall effect switch and said magnet are located on opposite sides of said passageway.

* * * * *